US009688934B2

(12) United States Patent
Aaron (10) Patent No.: US 9,688,934 B2
(45) Date of Patent: Jun. 27, 2017

(54) PROCESS FOR AND PROCESSOR OF NATURAL GAS AND ACTIVATED CARBON TOGETHER WITH BLOWER

(75) Inventor: Sherman Aaron, North Wilksboro, NC (US)

(73) Assignee: BIXBY ENERGY SYSTEMS, INC., Ramsey, MN (US)

( * ) Notice: Subject to any disclaimer, the term of this patent is extended or adjusted under 35 U.S.C. 154(b) by 1061 days.

(21) Appl. No.: 12/590,391

(22) Filed: Nov. 5, 2009

(65) Prior Publication Data

US 2010/0055026 A1    Mar. 4, 2010

Related U.S. Application Data

(63) Continuation of application No. 12/291,188, filed on Nov. 6, 2008, now abandoned.

(60) Provisional application No. 61/004,082, filed on Nov. 23, 2007, provisional application No. 61/137,213, filed on Jul. 28, 2008.

(51) Int. Cl.

| C10L 3/08 | (2006.01) |
|---|---|
| C10L 5/44 | (2006.01) |
| C10L 5/46 | (2006.01) |
| C10J 3/50 | (2006.01) |
| C10J 3/80 | (2006.01) |

(52) U.S. Cl.
CPC .................. *C10L 5/44* (2013.01); *C10J 3/503* (2013.01); *C10J 3/80* (2013.01); *C10L 3/08* (2013.01); *C10L 5/46* (2013.01); *C10J 2200/156* (2013.01); *C10J 2300/092* (2013.01); *C10J 2300/093* (2013.01); *C10J 2300/0909* (2013.01); *C10J 2300/0923* (2013.01); *C10J 2300/0946* (2013.01); *C10J 2300/0989* (2013.01); *Y02E 50/10* (2013.01); *Y02E 50/30* (2013.01)

(58) Field of Classification Search
None
See application file for complete search history.

(56) References Cited

U.S. PATENT DOCUMENTS

| 3,776,150 | A | | 12/1973 | Evans et al. |
|---|---|---|---|---|
| 3,853,498 | A | | 12/1974 | Bailie |
| 3,876,505 | A | | 4/1975 | Stoneburner |
| 3,887,461 | A | | 6/1975 | Nickerson et al. |
| 3,976,597 | A | * | 8/1976 | Repik et al. .................. 502/435 |
| 4,032,476 | A | | 6/1977 | Murty |
| 4,113,615 | A | | 9/1978 | Gorbaty |
| 4,148,752 | A | | 4/1979 | Bürger et al. |
| 4,149,994 | A | | 4/1979 | Murty |
| 4,149,995 | A | | 4/1979 | Murty |

(Continued)

FOREIGN PATENT DOCUMENTS

| DE | 3603003 | 1/1986 |
|---|---|---|
| EP | 147234 | 7/1985 |

(Continued)

OTHER PUBLICATIONS

Subramanian (Flow through Packed Beds and Fluidized Beds; Fall 2010).*

(Continued)

*Primary Examiner* — Guinever S Gregorio
(74) *Attorney, Agent, or Firm* — Fish & Richardson P.C.

(57) ABSTRACT

A method of and device for processing carboneceous material into gas and activated carbon together with blower.

20 Claims, 8 Drawing Sheets

(56) References Cited

U.S. PATENT DOCUMENTS

| | | |
|---|---|---|
| 4,219,415 A | 8/1980 | Nassef et al. |
| 4,225,531 A | 9/1980 | Jones et al. |
| 4,281,982 A | 8/1981 | Kardas |
| 4,322,243 A | 3/1982 | Frewer et al. |
| 4,492,771 A | 1/1985 | Hasewega et al. |
| 4,499,208 A | 2/1985 | Fuderer |
| 4,624,680 A | 11/1986 | Funk |
| 4,628,833 A | 12/1986 | O'Hagan et al. |
| 4,639,310 A | 1/1987 | Dohler et al. |
| 4,818,374 A | 4/1989 | Hirokoh et al. |
| 4,935,114 A | 6/1990 | Varma |
| 4,978,477 A | 12/1990 | Larsen et al. |
| 4,987,115 A | 1/1991 | Michel-Kim |
| 5,089,030 A | 2/1992 | Michel-Kim |
| 5,124,292 A | 6/1992 | Larsen et al. |
| 5,127,345 A | 7/1992 | Ishikawa et al. |
| 5,164,054 A | 11/1992 | Cha et al. |
| 5,187,141 A | 2/1993 | Jha et al. |
| 5,198,084 A | 3/1993 | Cha et al. |
| 5,232,679 A | 8/1993 | Jha et al. |
| 5,232,951 A | 8/1993 | Pfingstl et al. |
| 5,367,147 A | 11/1994 | Kim et al. |
| 5,472,581 A | 12/1995 | Wan |
| 5,589,599 A * | 12/1996 | McMullen ............... C01B 31/08 208/13 |
| 6,046,376 A | 4/2000 | Cha et al. |
| 6,239,067 B1 | 5/2001 | Palacios |
| 6,352,956 B1 | 3/2002 | Kienow et al. |
| 6,435,166 B1 | 8/2002 | Sato et al. |
| 6,562,104 B2 | 5/2003 | Bool, III et al. |
| 6,599,856 B1 | 7/2003 | Uchino et al. |
| 6,647,903 B2 | 11/2003 | Aguadas-Ellis |
| 6,669,822 B1 | 12/2003 | Fujimura |
| 6,720,283 B2 | 4/2004 | Ding et al. |
| 6,765,025 B2 | 7/2004 | Ding et al. |
| 6,793,866 B2 | 9/2004 | Kelly et al. |
| 6,902,589 B1 | 6/2005 | Guderian et al. |
| 7,108,767 B2 | 9/2006 | Noto |
| 2002/0069798 A1 | 6/2002 | Aguadas-Ellis |
| 2003/0000822 A1 | 1/2003 | Antonenko et al. |
| 2003/0027088 A1 | 2/2003 | Ueno et al. |
| 2005/0211636 A1 | 9/2005 | Schien et al. |
| 2006/0130401 A1 | 6/2006 | Giglio et al. |
| 2006/0278587 A1 | 12/2006 | Schien et al. |
| 2007/0014704 A1 | 1/2007 | Hashimoto et al. |
| 2008/0014537 A1 | 1/2008 | Atreya |
| 2008/0286557 A1 * | 11/2008 | Tucker ................... C10B 47/30 428/318.4 |

FOREIGN PATENT DOCUMENTS

| | | |
|---|---|---|
| EP | 204700 | 11/1989 |
| EP | 516187 | 9/1995 |
| EP | 652852 | 11/1996 |
| EP | 784035 | 7/1997 |
| EP | 641865 | 5/2000 |
| EP | 1584672 | 10/2005 |
| GB | 1598147 | 9/1981 |
| JP | 2004204109 | 7/2004 |
| JP | 20043522595 | 12/2004 |
| JP | 2005194132 | 7/2005 |
| JP | 2005281116 | 10/2005 |
| JP | 2006089322 | 4/2006 |
| JP | 2007325979 | 12/2007 |
| WO | WO 86/03692 | 7/1986 |
| WO | WO 94/03401 | 2/1994 |
| WO | WO 95/35439 | 12/1995 |
| WO | WO 97/17307 | 5/1997 |
| WO | WO 00/24671 | 5/2000 |
| WO | WO 01/51586 | 7/2001 |
| WO | WO 2006/064320 | 6/2006 |
| WO | WO 2007/048198 | 5/2007 |

OTHER PUBLICATIONS

Ebbe R. Skov, Dennis C. England, Franklin G. Rinker, Robert. J. Walty; Coal-Tar Chemicals and Syncrude Oil Production from Low-Rank Coals Using Mild-Temperature Pyrolysis; Presentation at AIChE Spring Nat'l Mtg, Houston, Texas, Apr. 22-26, 2007 AIChE Session—16002—#58d, Apr. 24, 2007.

International Search Report and Written Opinion mailed on Feb. 24, 2010 in corresponding International Application No. PCT/US09/05999 (5 pages).

* cited by examiner

PROCESS FOR AND PROCESSOR OF NATURAL GAS AND ACTIVATED CARBON TOGETHER WITH BLOWER

RELATIONSHIP TO PRIOR APPLICATIONS

The present application is a continuation-in-part of U.S. application Ser. No. 12/291,188 (the '188 application), filed Nov. 6, 2008 now abandoned entitled FLOW RATE OF GAS IN FLUIDIZED BED DURING CONVERSION OF CARBON BASED MATERIAL TO NATURAL GAS AND ACTIVATED CARBON and claims priority therefrom. The '188 application claims benefit of U.S. Provisional Patent Application 61/004,082, filed Nov. 23, 2007 entitled CLOSED LOOP FLUIDIZED BED FLASH GASIFICATION SYSTEM and U.S. Provisional Patent Application 61/137,213, filed Jul. 28, 2008 entitled LIQUIFACTION PROCESS FOR CHANGING ACTIVATED CARBON AND SYNGAS INTO DIESEL FUEL. All of the above applications are incorporated herein by reference as if fully set forth herein.

FIELD OF THE INVENTION

The present invention relates to fluid flow beds used in the process of converting carbon based matter into natural gas and activated carbon and more particularly related to the rate of fluid flow.

BACKGROUND OF THE INVENTION

Coal has long been used as a source of fuel. As the search for alternative fuels increases, several inventors have been looking toward further developing technology related to the use of coal. These inventors has come to recognize that the natural gas found in coal is not limited to coal, but rather is found in various forms of man-made and naturally occurring substances including, but not limited to municipal solid waste, sewage, wood waste, biomass, paper, plastics, hazardous waste, tar, pitch, activated sludge, rubber tires and oil-based residue.

The question has generally not been where one should look for natural gas, but rather how to liberate the natural gas. This has led to several different confined gasification liquefaction techniques. These systems in general terms include the down draft gasification, updraft gasification, and fluidized bed gasification.

The down draft gasification, also called a "co-current configuration system", relies on gravity to move the feedstock, which perhaps is coal. The ignition system flows with the feedstock with resultant ash or slag falling out the bottom. The ash or slag is hazardous waste and is treated as such. This system of partial combustion yields a low BTU gas that must undergo extensive cleaning.

The updraft gasification, also called a "countercurrent system", uses a blower to direct the feedstock up through the system. The combustion source is generally directed in an opposite direction to the feedstock or perpendicular to it. The ash and slag falls out the bottom where it is collected as hazardous waste. This is a partial combustion system that results in low BTU gas and tars that must be cleaned prior to use.

The conventional fluidized bed uses sand, char or some combination thereof. The fluid, usually air or steam, is directed through the sand, to the feedstock thereabove. The environment is usually oxygen starved resulting in partial combustion. The temperatures are relatively low resulting in low BTU gas that must be extensively cleaned prior to use. The ash is corrosive, invoking the use of limestone to minimize the corrosive effect. Some examples of the fluidized bed technology follow:

Giglio (U.S. Patent Application 2006/0130401) discloses a method of co-producing activated carbon in a circulating fluidized bed gasification process. The carbonecious material is treated in a fluidized bed to form syngas and char. (14) In a subsequent step, the char is turned to activated carbon with steam and carbon dioxide. Giglio teaches using the activated carbon to clean the syngas and separation of the gas and activated carbon. The cleaned syngas and solids are separated in a dust. Giglio uses a separator to separate the activated carbon and natural gas from the feedstock. That is, the gaseous flows through the fluidized bed are not used to separate components of carbonecious material on the basis of density.

Jha et al. (U.S. Pat. No. 5,187,141) discloses a process for the manufacture of activated carbon from coal by mild gasification and hydrogenation. The coal is first heated to a temperature between evaporation of water and below removal of volitilization. The dry coal is the heated in a mostly non-oxygenous atmosphere to volatilize and remove the contained volatile matter and produce char. In a second step, the char is subjected to a hydrogenation process to activate the carbon. The gaseous flows through the fluidized bed are not used to separate components of carbonecious material on the basis of density.

Ueno et al. (United States Patent Application 2003/0027088) discloses a method for treating combustible wastes. Combustible wastes includes paper, plastics, coal, tar, pitch, activated sludge, and oil-based residue. ¶8. The combustible wastes are carbonized at a temperature of around 400-600 degrees C. The carbonized material is then subjected to a temperature around 1000-1300 degrees C. in an inert atmosphere. This drives off the volatiles and may activate the carbon. The carbonized product is blown into exhaust gas, e.g., volatiles, to purify the exhaust gas. (Exhaust gas is preferred to be from refuse incineration, electric power plants, steel-making electric furnace, scrap melting furnace, and sintering machine.). The volatiles are used as a heat source for the carbonization step, although they are acknowledged to have harmful substances contained therein. ¶40.

The rate of fluid flow has generally not been discussed nor has the benefits of the fluid flow rate been considered. What is needed is a flow rate of gas in fluidized bed during conversion of carbon based material to natural gas and activated carbon that yields beneficial results that extend beyond the speed of combustion or conversion. Desirably, the flow rate separates material desired to be suspended above the fluidized bed from the material not desired to be above the bed.

SUMMARY OF THE INVENTION

The present method of processing carbonecious material into natural gas and activated carbon may include the steps of: placing feedstock onto a fluidized bed; directing non-oxygenated gas through the fluidized bed; adjusting a velocity of the gas such that the gas is slow enough to leave the feedstock on the fluidized bed and fast enough to remove activated carbon and volatiles.

In a preferred method, the process may include the steps of placing feedstock onto a fluidized bed; directing superheated non-oxygenated gas through the fluidized bed; adjusting a velocity of the superheated gas such that the gas is slow enough to leave the feedstock on the fluidized bed and fast enough to remove activated carbon and volatiles; allowing cleaning of the volatiles using the activated carbon to form clean natural gas and activated carbon; separating the natural gas and the activated carbon; recycling a portion of the natural gas back to the fluidized bed; collecting a non-recycled portion of the natural gas; and collecting the activated carbon.

Advantageously, the plenum fluidly joined to and leading away from the fluidized bed may be in an elevated position from the fluidized bed, permitting immediate co-mingling of the volatiles with the activated carbon yielding clean natural gas and activated carbon.

As yet another advantage, the velocity keeps the fluidized bed with a fresh supply of carbonecious material and self purges the processed materials from the fluidized bed.

As still yet another advantage, the process is completely devoid of water and oxygen, which leads to avoiding partial combustion, e.g. charring, or complete combustion, e.g. ash, and thus allowing the carbonecious material to proceed directly to activated carbon.

As still yet another advantage, the velocity operates as a gravity separator relying on the change in density between the feedstock and mixture of activated carbon and volatiles.

These and other advantages will become clear from reading the below description with reference to the appended drawings.

The figures are presented as being the best mode of the present invention and are not to be deemed limiting in any regard.

DETAILED DESCRIPTION

Definitions

The following terms, defined immediately below, have such meanings throughout the description and claims:

Activated carbon—a porous crystalline and/or amorphous structure made primarily of hydrogen deficient carbon. The carbon-to-carbon bonding within the activated carbon may be varied, including single, double, triple and quadruple bonds structured in chains and rings and may include monomers and polymers randomly found in and throughout the activated carbon. Activated carbon is not achieved through an intermediate step involving char or ash or arrived at through combustion.

Activated char—not truly activated carbon, but rather an amorphous carbon compound. Activated char may have an intermediary step of charring and involves partial combustion.

Amorphous carbon—a carbon compound with no particular structural arrangement. Amorphous carbon may be hydrogenated or may be at a hydrogen deficit.

Char—Char is an amorphous carbon structure substantially hydrogen deficient. Char is often found as a by-product of incomplete combustion of organic compounds including fossil fuels and biomass due to a partial deprivation of oxygen.

Crystalline carbon—a carbon compound with a definite structure. Crystalline carbon may be fully hydrogenated or substantially devoid of hydrogen. Crystalline carbon and amorphous carbon as used herein are opposite terms.

Diesel—a fuel that may be represented by the chemical formula $C12H23$, on average, but is a mixture of hydrocarbons generally between $C10H20$ to $C15H28$.

Feedstock—any carbon based material, preferably, but not limited to coal, biomass, municipal solid waste, sewage, wood waste, paper, plastics, hazardous waste, tar, pitch, activated sludge, rubber tires, oil-based residue and other carbon based matter. The feedstock should be dried and may have a diameter range between $1/16$ and $5/8$ inches and a preferred diameter range of between $1/8$ and $1/4$ inch when used in the preferred mode.

Gas—one of the three states of matter and does not necessarily denote the combustible matter. This invention is intended to be used in the production of combustible gas and where combustible gas is the intended term the term combustible, natural, diesel or other such distinguishing term will be used.

Hydrogen deficient carbon—carbon compounds that lack sufficient hydrogen to convert to combustible gas without hydrogenation.

Natural gas—Combustable material driven off of feedstock or manufactured from carbon chains shorter, e.g., methane and ethane, than used in diesel fuel. Natural gas is used within the ordinary and common use of the term.

Volatiles—gaseous material driven off of feedstock, which is generally combustible. While possible that trace amounts of non-combustable material may be included in the volatiles, the levels may be trace or less. (None were found upon testing.) The components in testable quantities of first volatiles were entirely clean natural gas. The first volatiles are generally are 90+% methane with the balance being slightly longer hydrocarbons. The second volatiles are presently not determined, but are understood to contain natural gas and hydrocarbons longer than natural gas and shorter than diesel.

DESCRIPTION

Overview

The present invention is most readily understood in components, but may be joined, integral or otherwise, into a comprehensive whole apparatus 10. Fully described below are components including first processor 130, blower 210 and second processor 410 together with their respective manners of operation. In combination, these components 130 and 210 process feedstock 12 into natural gas 16 and activated carbon 18. Under this section, description—overview, is a look at the overall process and is supported by the processor and blower descriptions below.

Numerals as used throughout are in part determined by the component in which the numeral is used. The part numbers are two digit when the numeral is selected for description of the entire apparatus 10, part numbers are three digit with a leading 1 when referring to first processor 130 and part numbers are three digit with a leading 2 when referring to the blower 210. Components such as activated carbon, natural gas and others may have multiple numbers with the leading digit indicating the section in which the component is being discussed and the two digit corresponding to the other parts within the appropriate section.

Figure 1:
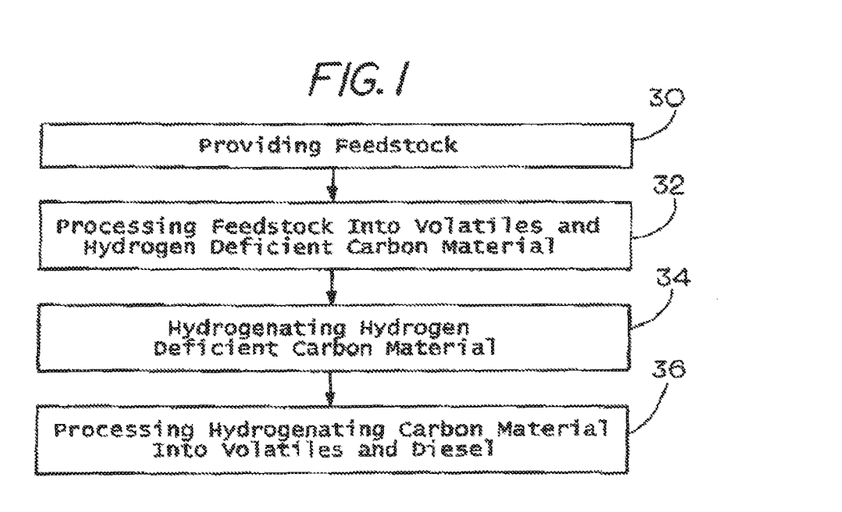
FIG. 1 is a flow chart showing the present inventive method.

The present inventive method of manufacturing diesel, may include the steps of providing a feedstock 12, step 30 of FIG. 1: processing the feedstock 12 to produce hydrogen deficient carbon material 20 and first volatiles 24, step 32; hydrogenerating the hydrogen deficient carbon material 20, step 34; and processing the hydrogenated hydrogen deficient carbon material 20 into second volatiles 26 and diesel 14, step 36.

Stated in differently, in breadth and terms, the present method of manufacturing diesel, preferably includes the steps of: providing a feedstock 12 having a hydrogen deficient carbon material 20: and processing the hydrogen deficient carbon material 20 into a mixture if volatiles 22 and diesel 14. Included may be intermediary steps of: processing the feedstock 12 into a mixture of first volatiles 24 and hydrogen deficient carbon material 20; and processing the hydrogen deficient carbon material 20 into a mixture of second volatiles 26 and diesel 14. The mixture of first volatiles 24 and hydrogen deficient carbon material 20 may be a mixture of natural gas 16 and activated carbon 18, whereas the mixture of second volatiles 26 and diesel 14 may include natural gas 16, hydrocarbons longer than natural gas 16 and shorter than diesel 14 and diesel 14.

The feedstock 12 may be selected from the group of coal, activated carbon, char, biomass and other carbon based matter. The hydrogen deficient carbon material 20 typically is activated carbon 18, but may be carbon in any crystalline, amorphous or combined configuration, including, but not limited to various chars. The first volatiles 24 preferably is natural gas 16. The second volatiles 26, while including natural gas 16, includes hydrocarbons longer than natural gas 16.

Figure 2:
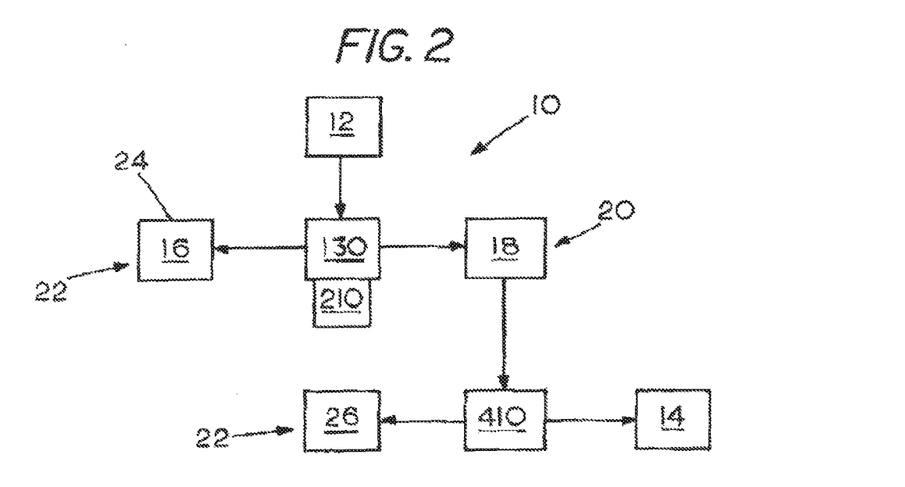
FIG. 2 is a block diagram showing the present inventive apparatus.

The present apparatus 10 for manufacturing diesel 14 may include a feedstock 12, a first a processor 130, the processor 130 being adapted to convert the feedstock 12 into a mixture of hydrogen deficient carbon material 20 and volatiles 22. A blower 210 preferably is in fluid communication with the feedstock 12 and adjusted to separate the feedstock 12 from hydrogen deficient carbon material 20 and volatiles 22. The blower 210 desirably is positioned partially within the first processor 130 and partially outside the first processor 130. Optionally, a second processor 410 may be operably joined to the first processor 210 and adapted to convert hydrogen deficient carbon material 20 into a mixture of diesel 14 and volatiles 22.

Stated differently, in breadth and terms, the apparatus 10 for manufacturing diesel 14 may include a feedstock 12 having hydrogen deficient carbon material 20 and a process 410 adapted to convert the hydrogen deficient carbon material 20 into a mixture of diesel 14 and volatiles 22.

DESCRIPTION

First Process/Processor

Figure 3:
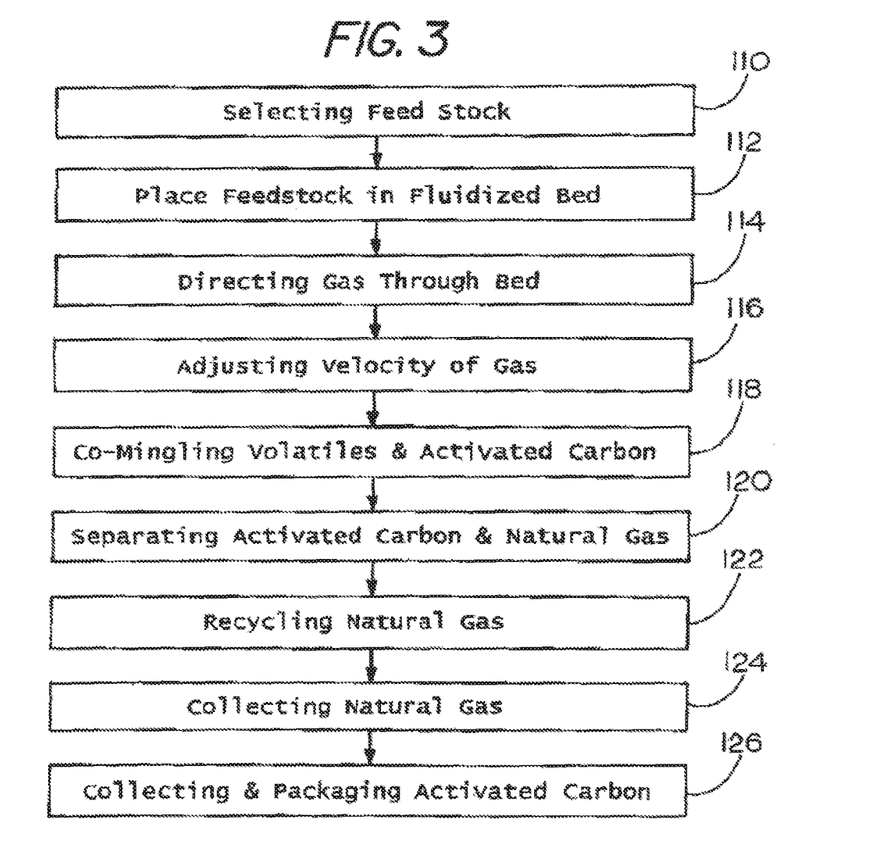
FIG. 3 is a flow chart showing the first process of the present inventive method.

Reference numerals 110-126 are reserved for process steps and are found on the flow chart designated as FIG. 3. Numerals 130 through 300 are reserved for apparatus components and are found on FIG. 4 through FIG. 6.

The present method of processing feedstock 134 into first volatiles 154 and hydrogen deficient carbon material 157 may have a first step 110 of selecting a feedstock 134 as shown in FIG. 3. Suitable material from which to generate feedstock 134 includes, but is not limited to, coal, municipal solid waste, sewage, wood waste, biomass, paper, plastics, hazardous waste, tar, pitch, activated sludge, rubber tires and oil-based residue. Coal is the preferred feedstock. The grade of coal is not significant, since this is not a process involving partial or complete combustion. However, wet material, including coal, should be dried.

The feedstock 134 is then placed onto a fluidized bed 144, signified on FIG. 3 as step 112. This step preferably is done in a controlled manner to preclude oxygen and/or water from entering with the feedstock 134. For instance, the feedstock 134 may enter through an airlock system 135.

Figure 6:
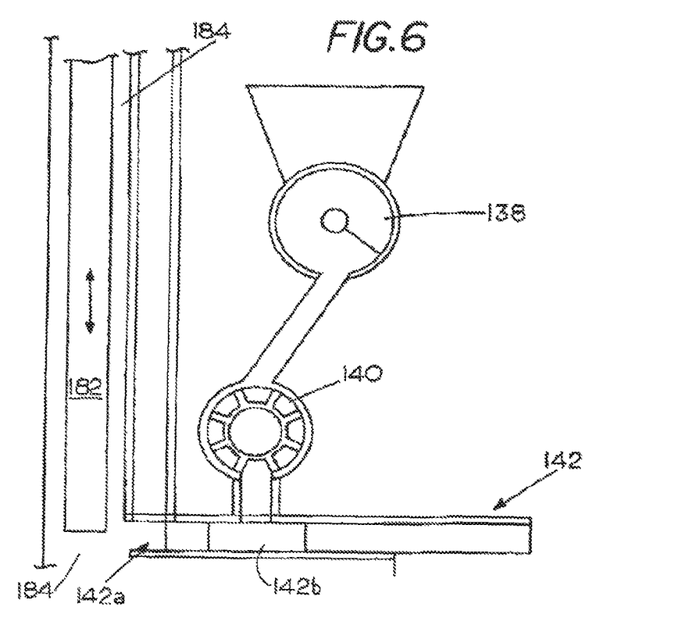
FIG. 6 is a schematic drawing of the airlock of the first processor.

The airlock system 135 may include a feed hopper 136, a screw auger 138, a rotary airlock 140, and a slide gate 142 with a sleeve 142a and aperture 142b. Feedstock 134 from the feed hopper 136 is directed by the screw auger 138 to the rotary airlock 140. Rotating the rotary airlock 140 drops feed stock 134 into the aperture 142b of the slide gate 142. Oscillation of the slide gate 142 through the sleeve 142a directs the feedstock 134 over the chute 184, whereupon the feedstock 134 falls onto the fluidized bed 144. The feedstock 134 encounters a slightly elevated atmospheric pressure as it reaches the chute 184. This pressurized atmospheric assures that any airflow through the air lock system 135 is in an outward direction, not inward. Other airlock systems are known to those of ordinary skill in the art and may be used in lieu of the disclosed airlock system 135.

The feedstock 134 is suspended in the superheated natural gas 149 of the fluidized bed 144. The feedstock 134 suspended on the fluidized bed 144 is done in such manner that the feedstock 134 is supported by matter that is in a gaseous state, e.g., the superheated natural gas 149. Feedstock 134 is floated in a gaseous stream. Superheated gas 149, which may be augmented by hydrogen or water, directed at the feedstock 134 forms the gaseous stream and is the preferred matter that is in the gaseous state.

Superheated natural gas 149 is directed, see 114 on FIG. 3, through the fluidized bed 144, which converts the feedstock 134 into first volatiles 154 and hydrogen deficient carbon 157. The hydrogen deficient carbon 157 preferably is activated carbon 156 and what is stated as to activated carbon 156 applies to hydrogen deficient carbon 157. The temperature needs to be selected in consideration of the feedstock size, since the volatiles 154 should all be released sufficiently fast to activate the carbon. The feedstock 134 should be between 1/16 and 5/8 inches in diameter and preferably the size is between 1/8 and 1/4 inches in diameter. This may be referred to as flash heating. The superheated natural gas 149 is clean, and may be natural gas 149 obtained from this disclosed process, herein referred to as recycled. The superheated natural gas 149 may be heated to a temperature between 1000 degrees F. and 1500 degrees F. and preferably is between 1000 degrees and 1200 degrees F. These temperatures are found desirable in that they flash heat the feedstock 134, driving off the volatiles rapidly e.g., seconds. The rapid vaporization, expansion, of the volatiles 154 activates the carbon.

The velocity, see element 116 of FIG. 3, of the superheated natural gas 149 is adjusted such that the natural gas 149 is slow enough to leave the feedstock 134 on the fluidized bed 144 and fast enough to remove a mixture of activated carbon 156 and volatiles 154, where the separating may be at the time that any feedstock is converted to volatiles 154 and activated carbon 156. The velocity separates the feedstock 134, activated carbon 156 and volatiles 154 based on density of the material, e.g. less dense material blows away (in a controlled manner). Feedstock 134 is more dense than activated carbon 156, which is more dense than volatiles 154. The velocity of the gas flow is thus set to move, e.g., convey, the less dense material, e.g. mixture of volatiles 154 and activated carbon 156 into a first plenum 152, allowing the feedstock 134 to remain on the fluidized bed 144 for further processing. The velocity is slow enough so as to not remove the feedstock 134. As the fluidized bed 144 continues to separate the volatiles 154 from the feedstock 134, the feedstock 134 converts directly to activated carbon 156 without an intermediary step of charring. The system, devoid of oxygen, does not have partial or complete combustion and thus does not form char or ash. The flow rate depends on the size of the fluidized bed. A very small bed may have a flow rate of 10 cubic feet per minute, while a very large bed may have a rate of 20,000 cubic feet per minute. Desirably, the velocity is between 5500 and 6500 cubic feet per minute and most preferably is approximately 6000 cubic feet per minute.

A displacer 182 may be positioned in the chute 184, perhaps vertically ocsillatable, may be used to adjust the size of the open area, e.g., volume, that is the fluidized bed 144. This in turn increases the velocity of the natural gas 149, assuming the overall flow rate, e.g., volume moved, remains unchanged. The displacer 182 beneficially allows for more efficient carbon removal from the fluidized bed 144 and keeps the fluidized bed 144 cleaner. In practice, a displacer 182 performs with better results than altering the velocity through the use of increased performance from one or more blowers 168. The preferred blower 168 is as described below in the section titled Description—Blower.

The activated carbon 156 and volatiles 154 are co-mingled from the fluidized bed 144 until the vortex separator 158 as will be discussed, see element 118 of FIG. 3. The activated carbon 156 in the mixture (or co-mingled collection) of volatiles 154 and activated carbon 156 cleans the volatiles 154 to form clean natural gas 149 and activated carbon 156. Harmful compounds, such as mercury, chlorine and sulfur compounds, gather in, are collected by and are stored in the activated carbon 156. The harmful compounds found in feedstock 134, commonly coal, are only known to liberate under conditions of combustion or application of a strong acid, neither one of which is found in the present invention. Accordingly, it is believed that harmful compounds do not liberate from the feedstock 134 and remain in the activated carbon 156 never being part of the volatiles 154. Testing on the current process has not shown any harmful compounds to be in the volatiles 154 and that the volatiles 154 leaving the fluidized bed 144 are clean natural gas 149. It should be noted that feedstocks 134 may have combustable gases that would be volatiles 154, but be longer carbon chains than natural gas 149. Cleaning, however, is allowed to occur to the extent any harmful substances do liberate. Cleaning the volatiles 154 using the activated carbon 156 to form clean natural gas 149 and activated carbon 156, may start at least as early as when the volatiles 154 and activated carbon 156 are leaving the fluidized bed 144, with the cleaning process continuing through completion.

The activated carbon 156 is separated from the natural gas 149 in a vortex separator 158, see element 120 of FIG. 3. The vortex separator 158 is of the size and manner known to one skilled in the art. The natural gas 149 may be drawn by a blower 168 through a second plenum 162 attached to the vortex separator 158, while the activated carbon 156 settles out the bottom of the separator 158. The resultant natural gas 149 is medium BTU natural gas, (1000 Btu/SCF). The activated carbon 156 collected at the bottom of the vortex separator 158 may be cooled, screened, graded/processed and packaged for sale or may remain heated and hydrogenated, forming additional natural gas 149. The activated carbon 156 ranges in size between a powder to ¼ inch diameter. The activated carbon 156 may be cooled in sealed cooling conveyors.

In a step of recycling 122 of FIG. 3, a portion, perhaps 10%, of the natural gas 149 may be recycled back to the fluidized bed 144 and a portion, perhaps 5% or less, may go to be recycled to a burner 180 for combustion that is used to superheat the gas for the fluidized bed 144. The non-recycled portion of the natural gas 149 may be collected as shown in step 124 of FIG. 3. Collecting 124 may include cooling, compressing and packaging the natural gas for sale. The activated carbon 156 collected at the bottom of the vortex separator 158 may be packaged for sale as identified in step 126 of FIG. 3.

Figure 4:
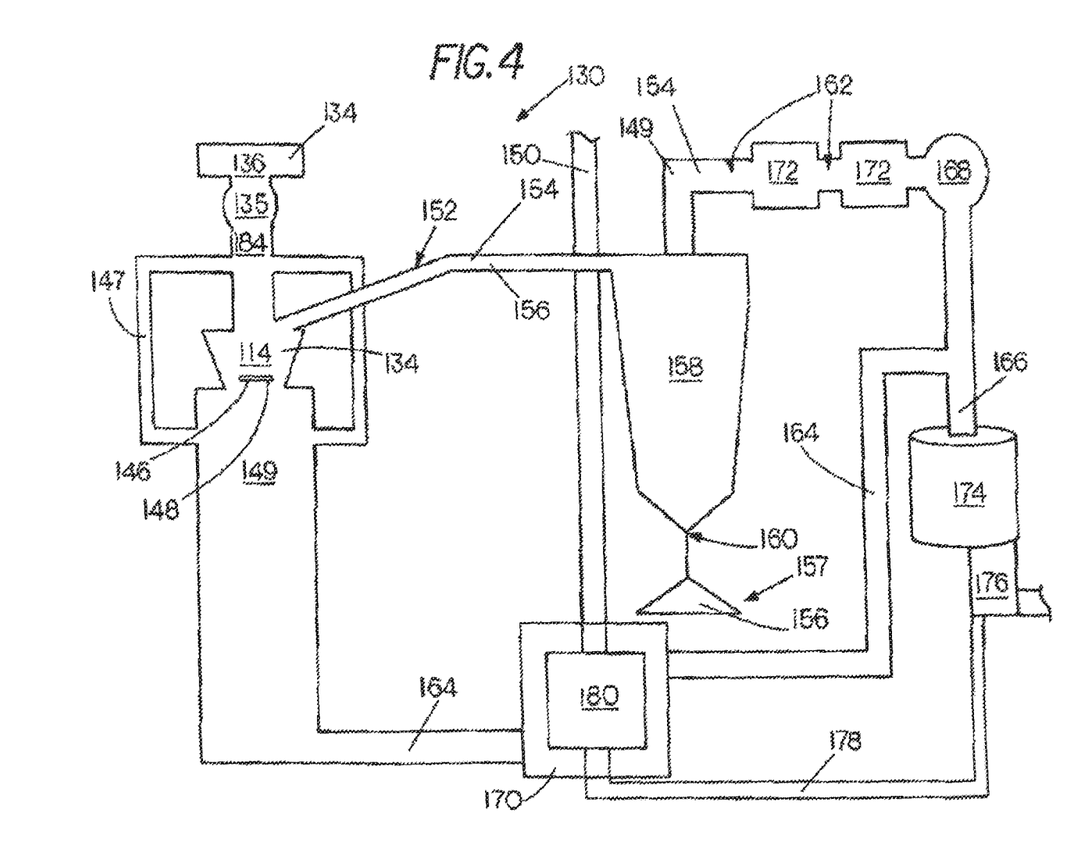
FIG. 4 is a diagram showing the first processor of the present invention.

Heretofore disclosed is a preferred method of processing feedstock 134 into natural gas 149 and activated carbon 156. The process is not a burning or partial burning process, but rather a temperature and density based separation process. Hereinafter described is the preferred apparatus 130 in which to carry out the disclosed process. Reference will be made to FIG. 4.

The processing apparatus 130 may have a feed hopper 136 joined to an airlock system 135. The airlock system 135 may have a screw auger 138, a rotary air lock 140, and a slide gate 142 positioned in a sleeve 142a and defining an aperture 142b. The screw auger 138 is in operable communication with the feedstock 134 in the feed hopper 136 and operably joined to the rotary airlock 140, which is operable connected to the aperture 142b. Rotating the screw auger 138 moves feedstock 134 from the feed hopper 136 to the rotary airlock 140. Turning the rotary airlock 140 drops feed stock 134 into the aperture 142b of the slide 142. Oscillating the slide 142 in the sleeve 142a, allows the feedstock 134 to drop through the aperture 142b into the chute 184 and to the fluidized bed 144.

Alternative airlock systems 135 known to those of ordinary skill in the art may be used. No air or water is to pass beyond the airlock system 135. Either lead to combustion, which is not part of the present process.

Figure 5:
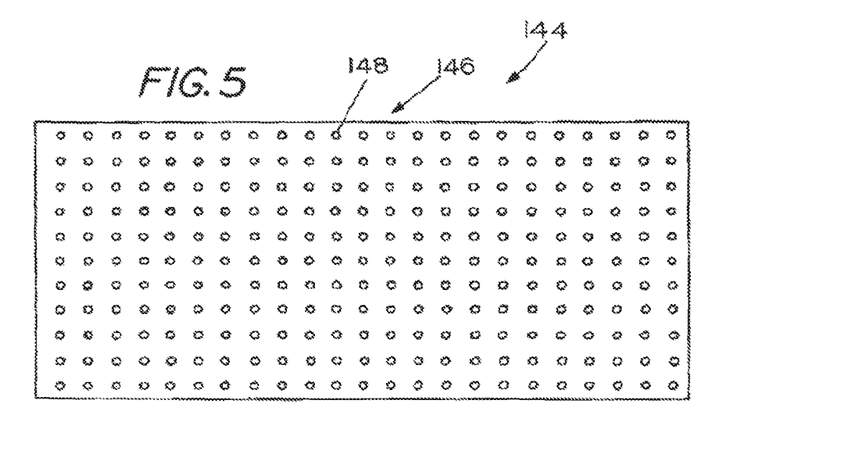
FIG. 5 is a plan view of the fluidized bed of the first processor.

Beyond the airlock 135, the feedstock 134 reaches the fluidized bed 144. Typically, a fluidized bed relies on sand or char as the bed through which the gas passes through. The present invention uses a metal grate 146 with small apertures 148 therethrough; the apertures 148 being smaller than the feedstock particles 134. The natural gas 149, alternative gases not involving oxygen may also be used, is directable through the fluidized bed 144 and is superheated to a temperature described above. The natural gas 149 may be directed through one or more bed conduits 151, the number and structure of which is selected to keep the natural gas 149 movable at an even velocity substantially devoid of dead spots at the fluidized bed 144. The velocity, discussed supra, suspends the feedstock 134 and blows the volatiles 154 and activated carbon 156 into a first plenum 152. The first plenum 152 is operably connected to the fluidized bed 144. The feedstock 134 is positioned on the fluidized bed 144, while superheated natural gas 149 passes through the fluidized bed 144.

The natural gas 149 passing through the fluidized bed 144 has a velocity. The velocity is adjustable to a point such that the natural gas 149 is slow enough to leave the feedstock 134 on the fluidized bed 144 and fast enough to remove volatiles 154 and activated carbon 156. As such, the natural gas 149 flow is a separator of feedstock 134 from a mixture of activated carbon 156 and volatiles 154, such separation occurring on the basis of density.

The volatiles 154 and activated carbon 156 are desirably in a generally homogenous co-mingled arrangement, e.g., a cloud arrangement comprising volatiles 154 and activated carbon 156, in the first plenum 152 to clean the volatiles 154, if any harmful compounds have been liberated, into clean natural gas 149. (Upon testing, no harmful compounds were found to have been liberated at any point during the process and in the apparatus described herein, thus the volatiles 154 were clean natural gas 149.) The plenum 152 is in fluid communication with the fluidized bed 144, being a receptor of a mixture of volatiles 154 and activated carbon 156 mixture therefrom. The first plenum 152, in fluid communication with the fluidized bed 144, may be positioned at a point elevated above the fluidized bed 144 and be sized and adapted to receive the volatiles 154 and activated carbon 156. Additional volatiles 154 are allowed to separate from the activated carbon 156 in the first plenum 152 which is maintained at or about the temperature of the fluidized bed 144.

The first plenum 152 is joined to and empties into a vortex separator 158, which is a volatile/activated carbon separator 138. Preferably, the vortex separator 158 is heated to maintain the temperature of the natural gas 149. It should be noted that the activated carbon 156 in the vortex separator 158 is at an elevated temperature and as such may be subjected to hydrogenation in a non-oxygenated atmosphere to form additional natural gas 149. The vortex separator 138 separates the volatiles 154 (natural gas 149) from the activated carbon 156 based upon gravity. (Note: The volatiles 154, after co-mingling with activated carbon 156 in the first plenum 152, is clean natural gas 149 and, after the first plenum 152, volatiles 154 and natural gas 149 are interchangeable terms.) In essence, the activated carbon 156 is removable out through an aperture 160 in the bottom of the vortex separator 158. The volatiles 154 are drawn into a second plenum 162, joined to the vortex separator 158. The second plenum 162 being designed for cooling, compressing, recycling, packaging natural gas as will now be described.

The second plenum 162 may include one or more blowers 168 positioned to maintain or adjust the velocity of the natural gas 149. The second plenum 162 joins to third and fourth plenums 164,166 respectively. A portion, perhaps 10%, of the natural gas 149 may be directed through the third plenum 164 to a heat exchanger 170 and back to the fluidized bed 144. (Insulation 147 may surround the fluidized bed 144 or the entire apparatus 130.) The heat exchanger 170 superheats the natural gas 149 prior to entry into the fluidized bed 144. The remaining natural gas 149, perhaps 90%, is directed into the fourth plenum 166 where it may interact with a heat exchanger 172 for cooling, a low pressure compressor 174 and bulk storage 176, ready for sale. A gas line 178 may lead from the bulk storage 176 to a burner 180 associated with the heat exchanger 170. The burner 180 combusts the natural gas 149 and provides heat to the heat exchanger 170. Post combustion gases, from the burner 180, may be directed up the stack 150. It should be noted that the fluidized bed and various plenums may be joined in a sealed relationship to form a closed loop system, where the only emissions out of the system are from the stack 150.

The first processor and first process have been disclosed in a manner understandable to those of ordinary skill in the art with reference to figures, which form a part of the disclosure herein, describing the best mode of making and using the present invention as known to the inventor hereof. Those of ordinary skill in the art will discern alterations which may be made without departing from the spirit and scope of the present invention as set forth in the claims below.

DETAILED DESCRIPTION

Blower

Figure 7:
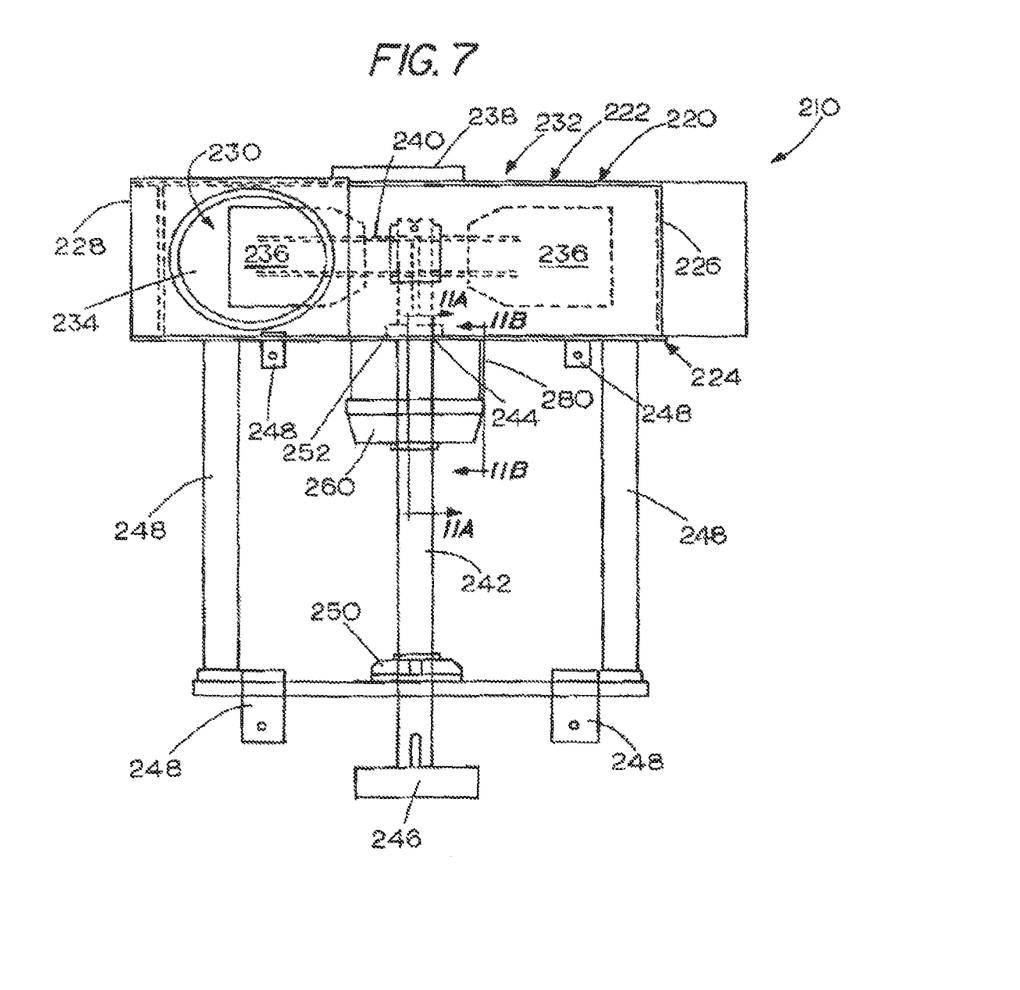
FIG. 7 is a side view in partial phantom showing the blower assembly and seal assembly of the present invention.

The present high temperature blower with environmental seal 210 may include a blower assembly 220, shaft 242, motor 246, housing assembly 260 and seal assembly 280. These components cooperate to form a blower 210 suitable for operation in high temperature environs where the blower 210 and motor 242 need to operate in separate atmospheres. These components will be discussed in serial fashion.

The blower assembly 220 may be any blower assembly known to those skilled in the art. Shown in FIG. 7 is a top plate 222 (also shown in FIG. 8), a bottom plate 224, a wrapper 226, outlet plate 228 and outlet 230, which cooperate to define a housing 232. The top plate 222 shown in FIG. 8 may be the same shape as the bottom plate 224. The housing 232 defines a chamber 234 in which the fan blades 236 move the gas in a cyclonic motion and direct the gas out through the outlet plate 228. Thus, gas may enter through an inlet 238, be accelerated and moved out through the outlet 230 defined in the outlet plate 228. Inside the housing 232, may be fan blades 236 and a spider 240.

The shaft 242 joins to the spider 240, which in turn is joined to the fan blades 236. The shaft 242 passes through a shaft opening 244 in the bottom plate 224 of the blower assembly 220, through the housing assembly 260 and the seal assembly 280, connecting to the motor 246. The motor 246 turns the shaft 242 thereby effecting movement of the fan blades 236 to direct gas in through the inlet 238 and out through the outlet 230. Various structural supports 248 may provide support between the blower assembly 220 and the motor 246. A bearing 250 may stabilize the shaft 242 relative to the motor 246. The housing assembly 260 is shown joined to the seal assembly 280, which in turn is joined to the bottom plate 224. A projection 252 on the seal assembly 280 may project into the blower assembly 220.

Figures 8, 9, 10:
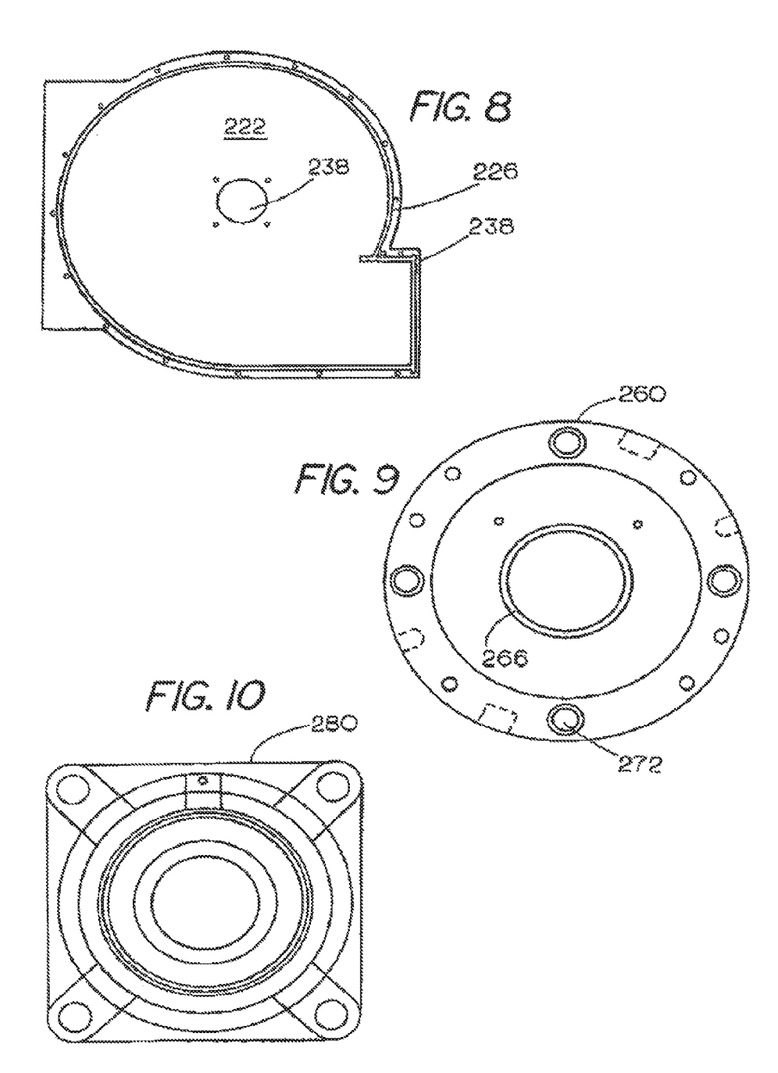
FIG. 8 is a top or bottom view of the housing assembly of the blower of the present invention.
FIG. 9 is a bottom view of the seal assembly of the blower of the present invention.
FIG. 10 is a top view of the seal assembly of the blower of the present invention.
Figure 11:
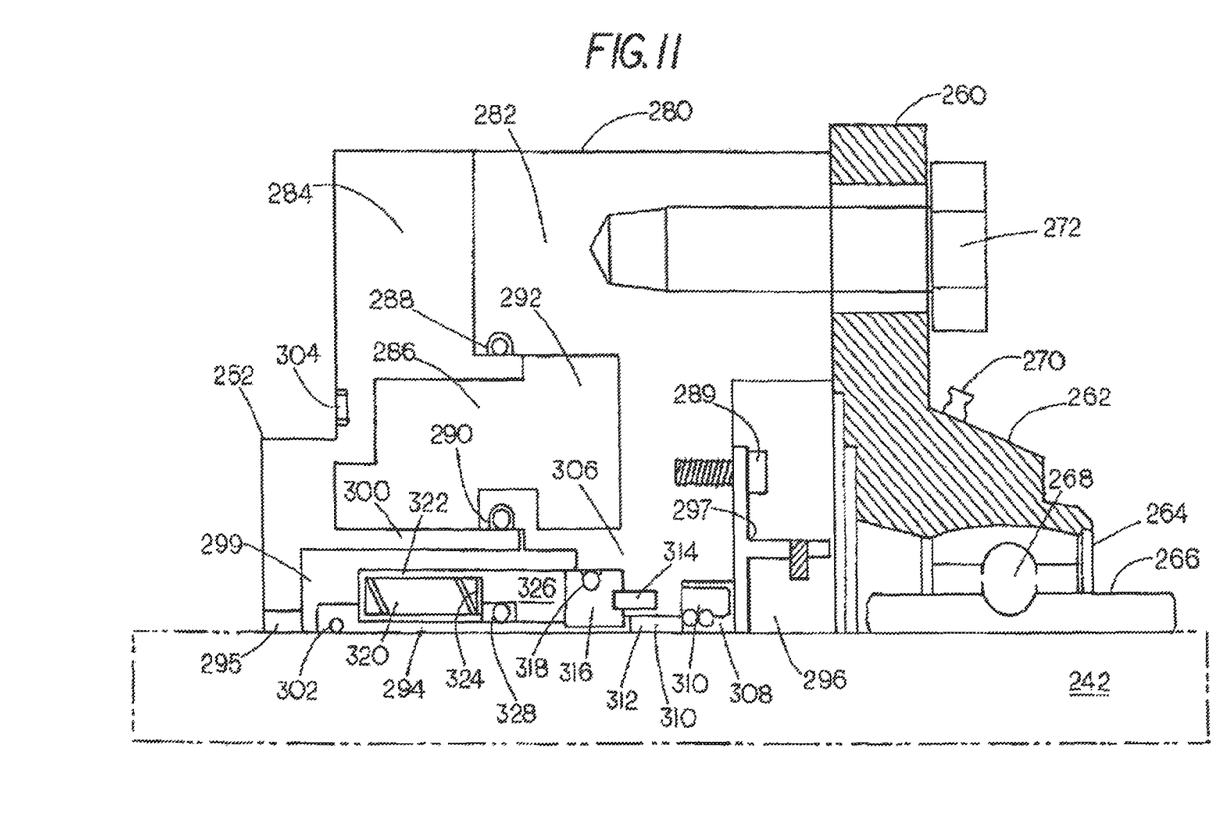
FIG. 11 is a right side portion of a partial cross-sectional view of the housing and blower assemblies of the present invention taken along the lines 11*a*-11*a* and 11*b*-11*b* of FIG. 7.

FIGS. 9-11 show the housing assembly 260 and seal assembly 280. As can be seen from FIGS. 9 and 10 the housing assembly 260 and seal assembly 280 are generally cylindrical, but may include protrusions that allow for bolts or other fasteners to pass therethrough.

Turning to FIG. 11, the housing assembly 260 may include an outer housing 262, which serves to encase a bearing 264. The bearing 264 may further include a bearing sleeve 266 that engages the shaft 242 on a side opposite a ball bearing 268. A grease port 270 preferably provides fluid communication with the ball bearing 268. The housing assembly 260 joins to the seal assembly 280 perhaps with fasteners 272.

It should be noted that the housing assembly 260 and seal assembly 280, being generally cylindrical are generally symmetrical, when looked at in cross section. To increase clarity, only one half of the cross section, e.g. one-quarter of the whole, is shown together with a portion of the shaft 242.

The seal assembly 280 may include a first housing portion 282 and a second housing portion 284 cooperatively define a coolant channel 286. O-rings 288,290, having differing diameters, provide a seal between the first and second housing portions 282,284. Ports, not shown, are preferred to be on opposite sides of the seal assembly 280. In this manner, coolant 292 may be directed into the coolant channel 286, flow around each side of the seal assembly 280 and out an exit port.

Positioned between the first and second housings 282,284 and the shaft 242 is a sleeve 294. The sleeve 294, which adds rotational support, rotates with the shaft 242 and has a collar 296 positioned at one end and inner gland 295 at the other end. The collar 296 is secured via a spacer 297 which may be fastened with at least one bolt 298 to the first housing 282. The inner gland 295 allows any heated gas that may pass through the shaft opening 244 to be received in a chamber 299. The chamber 299 is positioned adjacent the first and second housing portions 282,284 on a side opposite the coolant channel 286, thus defining a heat exchanger 300 therebetween. The gas within the chamber 299 remains relatively stagnant as there is no exit port and accordingly remains cooled by the coolant 292. Unintended exit ports are sealed with o-rings and oil in an outer gland, yet to be described.

A rubber o-ring 302, positioned in the sleeve 294, prevents gas that passed through the shaft opening 244 from further movement along the shaft 242. A gasket 304, preferably formed of graphfoil, prevents gas that passed through the shaft opening 244 from escape around the outside of the first and second housing portions 282,284. Thus, the o-ring 302 and gasket 304 preclude gas that passed through the shaft opening 244 from movement except into the chamber 299. The seals blocking escape of the gas from the chamber 299 are incorporated into the machined housing 306 for maintaining the sleeve 294.

The machined housing 306 maintains the sleeve 294 in alignment with the shaft 242 and seal assembly 280. Positioned adjacent the collar 296 is a lip seal 308. The lip seal 308 can be positioned in a void 310 containing oil 312 as a lubricant and as a seal to keep gas from the blower assembly 220 from escaping the seal assembly 280. The lip seal 308 rotatably secures one end of the sleeve 294. The oil 312 acts as a lubricant between parts that remain stationary relative to the seal assembly 280, such as the lip seal 308, and the components that rotate with the sleeve 294 as hereinafter described.

Moving from right to left, FIG. 11 shows a pin 314, which secures a mating ring 316 to the seal assembly 280. The mating ring 316 is preferred to be formed of silicon carbide for its strength, friction co-efficient and heat bearing properties. An o-ring 318 precludes gas from movement around the mating ring 316 further sealing the chamber 299. The lip seal 308, the pin 314, and the mating ring 316 do not rotate with the sleeve 294 and accordingly are lubricated with oil 312.

Spring 320 is shown biased against and between a retainer 322 and a disc 324. The disc 324 transfers the force of the spring 320 to a primary ring 326. The spring 320, retainer 322, disc 324, and primary ring 326 rotate with the sleeve 294 and apply pressure on the sleeve 294 in a direction away from the lip seal 308, thereby providing secure control of the sleeve 294 as it rotates with the shaft 242. The point of contact between the primary ring 326 and mating ring 316 is lubricated with oil 312, since the two rings 326, 316 move with respect to each other. The retainer 322 may fasten the primary ring 326 to the sleeve 294. An o-ring 328 may optionally be provided to further seal gas from the blower assembly 220 from escaping the chamber 299.

As one can discern from reading the above with reference to the figures, heated gas from the blower assembly 220 is effectively sealed in the chamber 299 through various o-rings, gasket 304 and oil 312. Thus, the gas remains stagnant and does not transfer heat from the blower assembly 220 to the o-rings. The shaft 242, however, may be thermally conductive and can transfer heat from the blower assembly 220 and a cooling effect from the portion of the shaft 242 adjacent the motor 246 to the seal assembly 280. Since the o-rings, and in particular o-ring 102 is closer to the blower assembly 220 than the motor 246 it could become heated especially in extreme temperature changes. However, the heat exchanger 300, transfers heat from the shaft 242 and sleeve 294 to the coolant 292, maintaining the o-rings, and in particular o-ring 302 at safe operating temperatures.

In use, the blower 210 includes the blower assembly 220 and seal assembly 280 joined to the blower assembly 220. The seal assembly 280 may further include at least one seal, such as O-rings 302, 328, gasket 304 or oil 312 and coolant 292, the coolant 292 being in thermal communication with at least a portion of the seal. The blower 210 can be positioned in two separate environments. The first environment may have a first temperature and containing a gas of a first type, but not the second type; and the second environment, having a second temperature and containing a gas of a second type, but not the first type.

For example, the preferred use of the blower 210 has the blower assembly 220 positioned in the first processor 130 where the temperature is at least 1000 degrees F. and most likely approximately 1200-1500 degrees F. and have a gas being combustible gas. The seal assembly 220 and motor 246 may be positioned in an environment where the temperature is no more than 100 degrees F. and the environmental gas is oxygenated. The shaft 242, rotatably joining the blower assembly 220 to the motor 246, may pass through both the first and second environments without the two environments intermixing. The seals preclude the gases from the environments from intermixing and the coolant 292 keeps the two environments at the preferred operating temperatures. (Note, mixing oxygen with the superheated combustible gas could cause undesired combustion and the motor 246 operates better at a temperature preferably at or below 100 degrees F.)

The coolant 292, which desirably is water, could be any thermally conductive flowable material such as anti-freeze and temperature adjusted gases. The coolant 292 may be in thermal communication with the seals, perhaps in a water jacket, such as coolant channel 286. Alternatively, the seal assembly may have any other heat exchanger 300 in thermal communication with the seals.

In operation, the motor 246 rotates the shaft 242, which rotates the fan blades 236. The seals, such as such as O-rings 302, 328, gasket 304 or oil 312, precludes commingling of gas from around the blower assembly 220 with that around the motor 246. Flowing coolant 292 in thermal communication with the seals maintains a temperature at which the seals do not degrade and remain operable. That is, placing a heat exchanger 300 in thermal communication with the seals keeps the seals at an operable temperature.

The blower has been described with reference to the drawings in a manner to fully disclose the best mode of making and using the present invention. Substantive and material changes may be made without departing from the spirit and scope of the present invention. For instance, the blower assembly 220 may be in a super cooled environment, instead of super heated, from which the motor may need to remain removed.

DETAILED DESCRIPTION

Second Process/Processor

Figure 12:
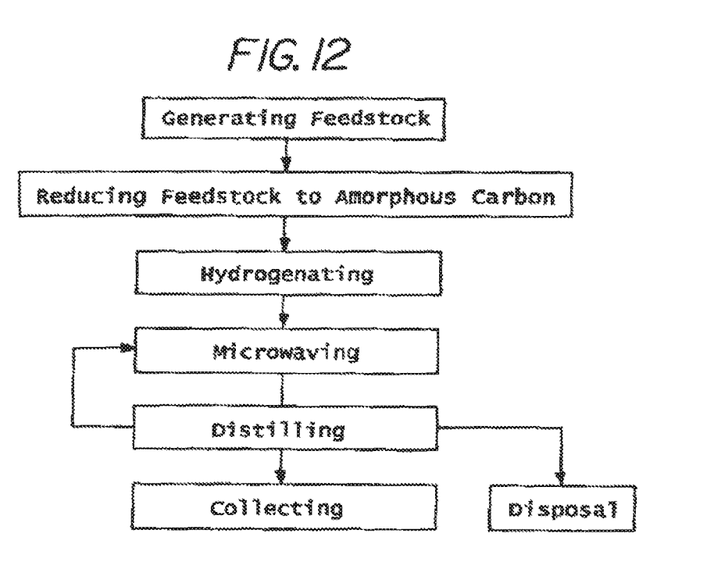
FIG. 12 is a flow chart showing the second process of the present invention.

The second processor (a fuel processing device) 410 may include generating mechanism 420 and converting mechanism 430. The converting mechanism 430 may further include reducing mechanism 440, hydrogenerating mechanism 450, a microwave 460, a catalyst 470 and a distillation apparatus 480. A flow chart, FIG. 12, is provided to show the various steps in the second process and such process is generally discussed throughout.

A suitable microwave 460, catalyst 470 and distillation apparatus 480 are described in the reference Thermal catalytic deploymerization (Rev. 15) Jan. 20, 2007, Bionic Microfuel Technologies, A.G. Such description is incorporated into this disclosure by reference. Each of these components will be described in serial fashion.

Figure 13:
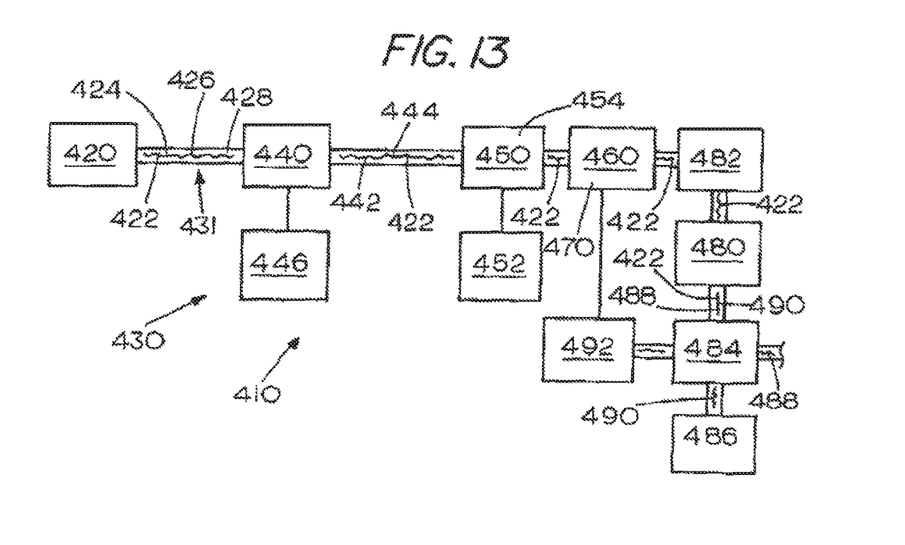
FIG. 13 is a schematic drawing showing the various components of the second processor of the present invention.

The generating mechanism 420, shown schematically in FIG. 13, produces feedstock 222, which may include activated carbon 424, char 426, coal 428 and/or other hydrogen deficient matter. Suitable generating mechanisms 420 include purchase of feedstock 422 on the open market. Production of feedstock 422 in the first processor 130 as described above. Production of feedstock 422 through manners described in the prior art, which is incorporated herein by reference, or manners known to those skilled in the art.

The reducing mechanism 440 of the converting mechanism 430 changes the feedstock 422 to a desired percentage of amorphous carbon 422. The activated carbon 424 is anticipated to be consistent throughout a batch 431 and may range from 100% amorphous to 100% crystalline and everything in between. Together the amorphous carbon 422, e.g. 100%. The activated carbon 424 may be converted to amorphous carbon 442 allowing more complete hydrogenation. Accordingly, testing apparatus 446 may be provided for determining the percent concentration of amorphous carbon 442 and percentage crystalline carbon 444 in a batch 431 of feedstock 422. Such testing apparatus may be X-ray crystallography, powder diffraction (SDPD) as disclosed in information by such companies as Inel, Rigaku MSC and Bede Scientific Instruments Ltd or performed in any other manner known to those skilled in the art.

The crystalline (activated) carbon 444 may need to be decrystallized or deploymerized, which may be done in the microwave 460 described below. Accordingly, the knowledge of percent amorphous carbon 442 versus crystalline carbon 444 may be used to determine the process, dwell time, and energy applied to the crystalline carbon 444 to yield a desired percentage of amorphous carbon 442 with the lowest expenditure of resources. The desired level of amorphous carbon 442 may be 100% or a lesser figure.

The reducing mechanism 440 may include the microwave 460 described below or may be heat from any source, chemical deploymerization/decrystallization and/or other manners known to those of ordinary skill in the art of producing amorphous carbon 429, including oxygen starved superheating.

The feedstock 422 has at least a useable portion that is devoid or substantially devoid of hydrogen atoms as in needed in the generation of diesel 490. Substantially devoid, refers to a deficieny of adequate proportion to preclude full formation of the hydrocarbons in diesel 490. Accordingly, the hydrogenating mechanism 450 joins hydrogen atoms to carbon atoms, while the carbon is in either a feedstock form 422, e.g., activated carbon 424, char 426, short hydrocarbon chains (natural gas) and/or coal 428 and have either an amorphous carbon 442 or crystalline carbon 444 structure, preferred in amorphous carbon 442. Such a chemical reaction is endothermic. The hydrogenating mechanism 450 may include a heat source 452 and hydrogen gas or any other suitable hydrogen source 454. The heat source 452 may take the form of the feedstock 422 being pre-heated to a temperature between 340° F. and 650° F. at any point between and including the generating mechanism 420 and microwave 460 or being heated by the microwave 460. While the feedstock 422 is heated to a temperature at or above 340° F., the feedstock 422 is subjected to the hydrogen gas 454. Carbon, hydrogen and combinations thereof are volatile at high temperatures, allowing the hydrogenation. Accordingly, the feedstock 422 may be maintained at a temperature at or below the flash point of carbon, preferably at or below 300 degrees C. and/or maintained in a non-oxygenated atmosphere.

CONCLUSION

The apparatus 10 and method associated therewith has been fully described above including the processor 130 and the blower 210. In combination, these components 130 and 210 process feedstock 12 into natural gas 16 and activated carbon 18. The description of the apparatus 10 and overall process has been supported by the descriptions of the processor 130 and the blower 210.

The apparatus 10 has been described with reference to the appended drawings and the best mode of making and using the present invention known at the time of filing. One can see that various modifications, some of which have been mentioned can be made without departing from the spirit and scope of the present invention as is set forth in the claims below.

I claim:

1. A method for processing carbon-based feedstock into natural gas, the method comprising:
   introducing carbon-based feedstock to a fluidized bed;
   flowing superheated non-oxygenated gas through the fluidized bed to the carbon-based feedstock at a velocity sufficient to remove activated carbon and volatiles from the feedstock and maintain the carbon-based feedstock on the fluidized bed;
   converting the carbon-based feedstock into volatiles and activated carbon;
   co-mingling the separated volatiles and activated carbon, the co-mingling cleaning the volatiles using the activated carbon and forming natural gas, wherein the activated carbon is not charred through the process;
   separating the natural gas from the activated carbon; and
   recycling a portion of the natural gas into the flow of superheated non-oxygenated gas, the recycled portion at least partially converting the carbon-based feedstock into the volatiles and the activated carbon.

2. The method of claim 1, wherein the volatiles consist of natural gas.

3. The method of claim 1, wherein the natural gas is free of at least one of mercury, chlorine and sulfur compounds.

4. The method of claim 1, wherein harmful compounds remain in the feedstock throughout the steps of the method.

5. The method of claim 4, wherein the resultant natural gas is 1000 BTU/SCF.

6. The method of claim 5, wherein the non-oxygenated gas superheated non-oxygenated gas has a temperature of between 1000 degrees F. and 1200 degrees F.

7. The method of claim 1, wherein the resultant natural gas is medium BTU gas.

8. The method of claim 1, wherein the superheated non-oxygenated gas has a temperature of between 1000 degrees F. and 1500 degrees F.

9. The method of claim 1, wherein the flow rate of the fluidized non-oxygenated gas is 10 cubic feet per minute to 20,000 cubic feet per minute.

10. The method of claim 1, wherein the method does not form ash.

11. The method of claim 1, further including the step of vaporizing the volatiles.

12. The method of claim 1, wherein a portion of the natural gas is collected.

13. The method of claim 12, wherein the collected natural gas is packaged for sale.

14. The method of claim 1, wherein cleaning the volatiles using the activated carbon and forming natural gas includes removing harmful compounds including at least one of mercury, chlorine and sulfur compounds from the volatiles.

15. A method for engineering clean natural gas, the method comprising:
introducing carbon-based feedstock to a fluidized bed;
flowing non-oxygenated gas through the fluidized bed to the carbon-based feedstock at a velocity sufficient to separate volatiles and activated carbon from the feedstock based on the densities of the volatiles and activated carbon;
converting the carbon-based feedstock into the volatiles and the activated carbon;
co-mingling the separated volatiles and activated carbon, the co-mingling cleaning the volatiles using the activated carbon and forming natural gas;
separating the natural gas from the activated carbon; and
recycling a portion of the natural gas into the flow of non-oxygenated gas, the recycled portion at least partially converting the carbon-based feedstock into the volatiles and the activated carbon, wherein the flowing non-oxygenated gas is at a temperature between 1000 degrees F. to 1500 degrees F., and further wherein the activated carbon is not charred through the process and the natural gas is free of at least one of mercury, sulfur and chlorine compounds.

16. The method of claim 15, wherein the carbon-based feedstock is coal.

17. The method of claim 15, wherein the non-oxygenated gas is at a temperature of about 1200 degrees F.

18. The method of claim 15, wherein the activated carbon is crystalline.

19. The method of claim 15, wherein the activated carbon is amorphous.

20. A method for engineering clean natural gas, the method comprising:
introducing carbon-based feedstock to a fluidized bed;
flowing non-oxygenated gas through the fluidized bed to the carbon-based feedstock at a flow rate of 5500 and 6500 cubic feet per minute;
converting the carbon-based feedstock into volatiles and activated carbon;
removing the activated carbon and the volatiles from the feedstock,
co-mingling the separated volatiles and activated carbon, the co-mingling cleaning the volatiles using the activated carbon and forming natural gas;
separating the natural gas from the activated carbon; and
recycling a portion of the natural gas into the flow of non-oxygenated gas, the recycled portion at least partially converting the carbon-based feedstock into the activated carbon and the volatiles, and wherein the activated carbon is not charred through the process and the natural gas is free at least one of mercury, sulfur and chlorine compounds.

* * * * *

UNITED STATES PATENT AND TRADEMARK OFFICE
CERTIFICATE OF CORRECTION

| | | |
|---|---|---|
| PATENT NO. | : 9,688,934 B2 | Page 1 of 1 |
| APPLICATION NO. | : 12/590391 | |
| DATED | : June 27, 2017 | |
| INVENTOR(S) | : Sherman Aaron | |

It is certified that error appears in the above-identified patent and that said Letters Patent is hereby corrected as shown below:

On the Title Page (75), delete "North Wilksboro" and insert -- North Wilkesboro --;

(57), delete "carboneceous" and insert -- carbonaceous --;

In the Specification

Column 1, Line 7, delete "continuation-in-part" and insert -- continuation --;

Column 1, Line 17, delete "LIQUIFACTION" and insert -- LIQUEFACTION --.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*